US005438743A

United States Patent [19]

Simington et al.

[11] Patent Number: 5,438,743

[45] Date of Patent: Aug. 8, 1995

[54] APPARATUS FOR EXTRACTING AND INSTALLING A HINGE PIN

[76] Inventors: Rusty Simington, 8157 E. Susan Cir., Prescott, Ariz. 85314; William Chilson, 670 Daniel Dr., Prescott, Ariz. 85301

[21] Appl. No.: 176,836

[22] Filed: Jan. 3, 1994

[51] Int. Cl.[6] ........................ B23P 19/04; B25B 27/02

[52] U.S. Cl. ........................................ 29/275; 29/11; 29/254; 29/267

[58] Field of Search .................. 29/11, 254, 267, 275, 29/256, 255, 278, 280; 72/479; 81/463; 254/21, 131

[56] References Cited

U.S. PATENT DOCUMENTS

| | | | |
|---|---|---|---|
| 4,432,125 | 2/1984 | Monteleone et al. | 29/275 X |
| 4,464,819 | 8/1984 | Steck et al. | 29/267 |
| 4,627,141 | 12/1986 | Teske | 29/275 |
| 5,054,180 | 10/1991 | Combs | 29/275 |
| 5,184,385 | 2/1993 | Valesh | 29/254 |

FOREIGN PATENT DOCUMENTS

| | | | |
|---|---|---|---|
| 2928670 | 2/1981 | Germany | 29/275 |
| 2075410 | 11/1981 | United Kingdom | 29/275 |

*Primary Examiner*—Peter Vo

*Attorney, Agent, or Firm*—Harry M. Weiss; Jeffrey D. Moy

[57] ABSTRACT

A bar has a slot with the shank of a pin of a hinge therein. The slotted bar is connected to one end of a force transfer bar, the other end being connected to one end of a lever bar. Bottom surfaces of the slotted bar and the force transfer bar subtend an obtuse angle. Top surfaces of the force transfer bar and the lever bar subtend an obtuse angle. An anvil is connected to the lever bar. When the pin is being installed in the hinge, a retention bar bears against the top of the head of the pin. Force from an air hammer is transferred via the anvil through the lever, transfer and retention bars to the top of the head of the pin. When the pin is being extracted, the force is transferred through the slotted bar to the bottom of the head.

8 Claims, 1 Drawing Sheet

APPARATUS FOR EXTRACTING AND INSTALLING A HINGE PIN

BACKGROUND OF THE INVENTION

1. Field of Invention

This invention is in the field of power tool accessories and methods therefor and, more particularly, is an accessory to an air hammer that is used for alternatively installing and extracting a hinge pin in a hinge and method therefor.

2. Description of the Prior Art

In removing a door of an automobile, a mechanic uses a hammer and a punch to extract a pin from a hinge of the door. The mechanic has access to the pin when he opens the door and positions himself in a confined area between the open door and the inside of the automobile. Additionally, the pin is in a portion of the hinge between a door jamb and the door. The space between the door jamb and the door is usually too small for the mechanic to make satisfactory use of the hammer.

The pin may be rusted, thereby making the extraction either difficult or impossible. However, under the best of conditions, the extraction is time consuming.

Many of the difficulties encountered in the removal of the door are encountered with the installation of the door. During the installation, the mechanic is restricted to the confined area. The only substantive difference is that the punch is positioned for inserting the pin instead of removing it. Heretofore, there has not been a way to utilize a power tool to reduce the time for the extracting and the installation that is easily used in the area where the hinge is located.

SUMMARY OF THE INVENTION

An object of the present invention is to provide an accessory to an air hammer that is operable to alternatively remove and insert a pin of a hinge and method therefor.

BRIEF DESCRIPTION OF THE PREFERRED EMBODIMENT

A flat metal bar has a slot at its distal end. The proximal end of the slotted bar is connected to one end of a force transfer bar, the other end being connected to one end of a lever bar. Bottom surfaces of the slotted bar and the force transfer bar subtend an obtuse angle. Top surfaces of the force transfer bar and the lever bar subtend an obtuse angle. A cylindrical anvil is connected to the lever bar with its axis perpendicular to the top surface thereof.

The invention provides a simple, economical accessory to an air hammer that is alternatively useable to install and extract a pin of a hinge located in an area where a hand tool cannot be satisfactorily used.

Other objects, features and advantages of the invention will be apparent from the following description of the preferred embodiment as illustrated in the accompanying drawing.

DESCRIPTION OF THE PREFERRED EMBODIMENT

Figure 1:
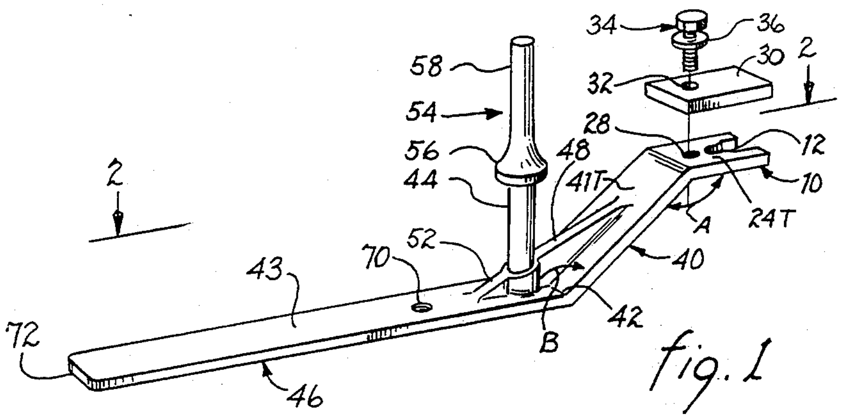
FIG. 1 is an exploded perspective view of the preferred embodiment of the present invention.
Figure 2:
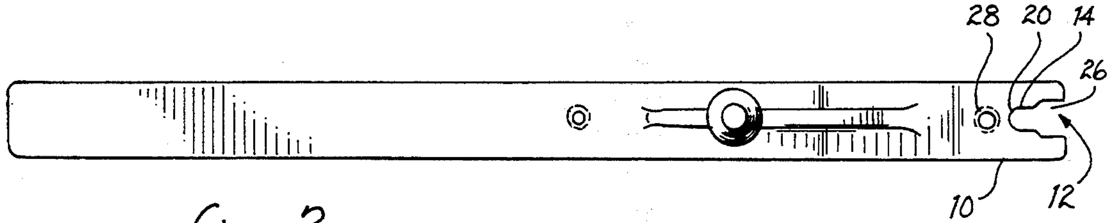
FIG. 2 is a view of FIG. 1 taken along the line 2—2.
Figure 3:
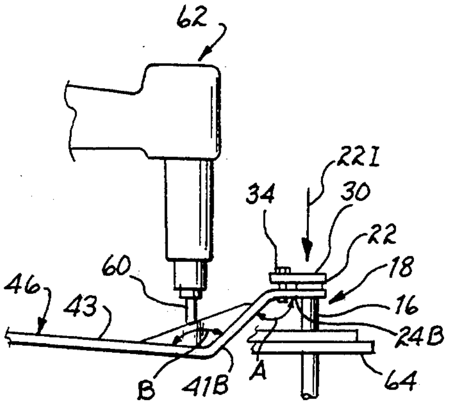
FIG. 3 is a side elevation of the embodiment of FIG. 1 being used to install a pin in a hinge of a door of an automobile.

As shown in FIGS. 1–3, an accessory to an air hammer includes a flat bar 10 (FIGS. 1 and 2) that has a distal end with a slot 12 therein. An inner section 14 of slot 12 has a width substantially equal to the diameter of the shank 16 of a pin 18 that is alternatively installed in or extracted from a hinge.

An end 20 of section 14 has a radius of curvature substantially equal to the radius of shank 16. When pin 18 is either being extracted or being installed, bar 10 is positioned with shank 16 within section 14 in an abutting relationship with end 20.

When pin 18 is being installed, the bottom of the head 22 (FIG. 3) of pin 18 is maintained against a top surface 24T (FIG. 1) of bar 10 in a manner explained hereinafter. An outer section 26 (FIG. 2) of slot 12 is of a width greater than the width of section 14 to facilitate an initial capturing of shank 16 within slot 12.

Bar 10 has a threaded hole 28 therethrough. A retention bar 30, having substantially the same length, width and thickness as bar 10, has a hole 32 therethrough. When bar 30 is placed upon bar 10 with holes 28, 32 in axial alignment, a screw 34 that carries a washer 36 passes through hole 32 to hole 28 for threaded engagement therein.

The engagement of screw 34 within hole 28 causes bar 30 to bear against the top of head 22, thereby maintaining the bottom of head 22 against surface 24T. Since the bottom of head 22 is maintained against surface 24T, shank 16 is retained within section 14 when pin 18 is being installed.

A proximal end 38 of bar 10 is integrally connected to a force transfer bar 40 with a bottom surface 24B and a bottom surface 41B of bar 40 subtending an obtuse angle, A (FIG. 3). Bars 10, 40 have substantially the same width and thickness.

A distal end 42 of bar 40 is integrally connected to a lever bar 46, with a top surface 41T of bar 40 and a surface 43 of bar 46 subtending an obtuse angle, B. Bars 40, 46 have substantially the same width and thickness. Applicants have found that angle A is preferably less than angle B.

A cylindrical member 44 has one end welded to surface 43, with the axis of member 44 perpendicular to surface 43. Additionally, a wedge shaped support plate 48 is welded to member 44, and surfaces 41T, 43. Similarly, a wedge shaped support plate 52 is welded to member 44 and surface 43. Support plates 48, 52 provide support for maintaining a fixed connection of member 44 to surface 43.

The other end of member 44 is integrally connected to an anvil 54 that has the general shape of a golf tee. More particularly, a flared end 56 of anvil 54 is coaxially connected to member 44. An end 58 of anvil 54 is of a diameter that makes it adapted for insertion into a percussion sleeve 60 (FIG. 3) of an air hammer 62. When pin 18 is being installed,member 44 and anvil 54 extend upward (FIGS. 1 and 3).

Figure 4:
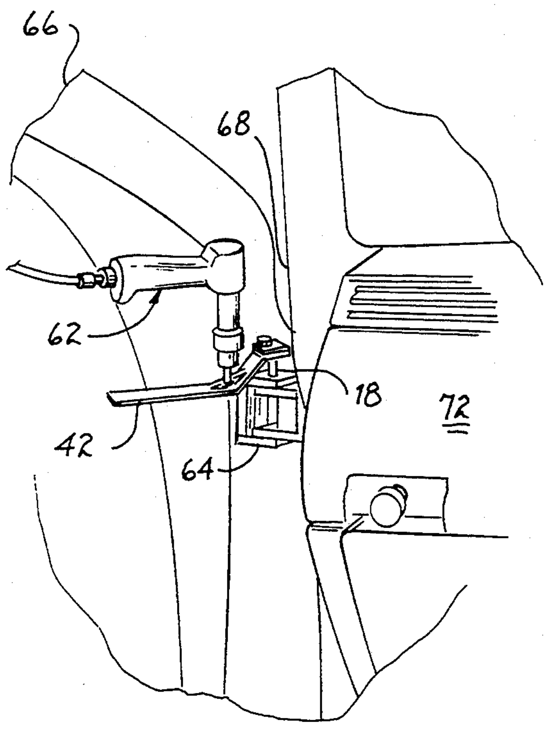
FIG. 4 is a perspective view of a tool in the embodiment of FIG. 1 being used to install a pin in a hinge.

As shown in FIG. 4, a hinge 64 is connected to a door 66 and to a door jamb 68 of an automobile. A dashboard 72 of the automobile is adjacent door jamb 68. According to the present invention, the displacement of anvil 54 from slot 12 causes anvil 54 to be at a location where air hammer 62 can be conveniently used to either install pin 18 in hinge 64 or extract it therefrom. When end 58 is within percussion sleeve 60 with bar 30 bearing against the top of head 22 (FIG. 3), force provided by air hammer 62 is transferred via anvil 54 and member 44 through bars 42, 40, 30 in the direction of arrow 22I to the top of head 22, whereby pin 18 is installed.

Bar 42 has a threaded hole 70 therethrough. Hole 70 is similar to hole 28. When pin 18 is not being installed, bar 30 is placed upon surface 43 with holes 32, 70 in axial alignment. Screw 34, with washer 36 carried thereon, passes through hole 32 to hole 70 for threaded engagement therein whereby bar 30, screw 34 and washer 36 are stored for use when a pin is being installed.

Figure 5:
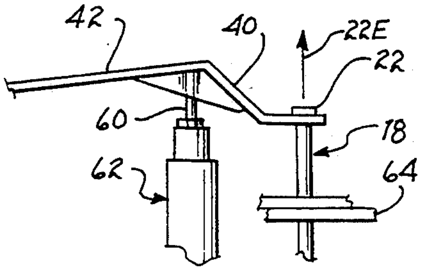
FIG. 5 is a side elevation of a tool in the embodiment of FIG. 1 being used to extract a pin from a hinge.

As shown in FIG. 5, when pin 18 is being extracted, member 44 and anvil 54 extend downward. Additionally, bar 10 is positioned with shank 16 in the abutting relationship with end 20 as described in connection with the installation of pin 18. When end 58 is within percussion sleeve 60, force provided by air hammer 62 is transferred via anvil 54, member 44 and bar 40 through bars 46, 49, 10 in the direction of an arrow 22E to the bottom of head 22, whereby pin 18 is extracted.

It should be understood that during either the installation or extraction, it may be desirable to manually support a distal end 72 of bar 42. Using well known principles of physics, it is preferable to have the ratio of the distance between end 72 and member 44 and the distance between member 44 and slot 12 as large as practical, thereby minimizing the manual support.

While the invention has been shown and described with reference to a preferred embodiment thereof, it should be understood by those skilled in the art that changes in form and detail may be made therein without departing from the spirit and scope of the invention.

We claim:

1. An accessory for an air hammer, comprising:
- a flat metal bar having a slot at its distal end, said slot having a width substantially equal to a width of a pin that is alternatively installed and extracted from a hinge;
- a force transfer bar having one end integrally connected to the proximal end of said flat metal bar, with bottom surfaces of said force transfer bar and said flat metal bar subtending a first obtuse angle;
- a lever bar with its proximal end integrally connected to the other end of said force transfer bar with top surfaces of said lever bar and said force transfer bar subtending a second obtuse angle;
- an anvil connected to said lever bar for insertion into a percussion sleeve of said air hammer;
- a first support plate coupled between said force transfer bar, said lever bar, and a portion of a member for maintaining a fixed connection of said member to said lever bar; and
- a second support plate coupled between said portion of said member and said lever bar for maintaining a fixed connection of said member to said lever bar.

2. The accessory of claim 1 wherein said slot has an inner section and an outer section and an outer section having respective widths that are substantially equal to said width of said pin and greater than said width of said pin.

3. The accessory of claim 2 wherein said inner section has an end with a radius of curvature substantially equal to one half of said width of said pin.

4. The accessory of claim 1 wherein said flat metal bar has a threaded hole therethrough, additionally comprising:
- a retention bar having a hole therethrough; and
- a screw that passes through said retention bar hole and is engaged within said threaded hole when said holes are in axial alignment and a shank of said pin is in said slot when said pin is being installed, said retention bar bearing against the top of the head of said pin.

5. The accessory of claim 4 wherein said retention bar and said flat metal bar have substantially the same length, width and thickness.

6. The accessory of claim 1 wherein said first obtuse angle is less than said second obtuse angle.

7. The accessory of claim 1 wherein said lever bar and said force transfer bar have substantially the same width and thickness.

8. The accessory of claim 1 wherein said member comprises a cylindrical member having one end connected to said top surface of said lever bar with the axis thereof substantially perpendicular to said top surface of said lever bar, said anvil having the general shape of a golf tee, with a flared end thereof coaxially connected to the other end of said cylindrical member.

* * * * *